US007047130B2

(12) United States Patent
Watanabe et al.

(10) Patent No.: US 7,047,130 B2
(45) Date of Patent: May 16, 2006

(54) ROAD STATUS DATA PROVIDING SYSTEM

(75) Inventors: Tomo Watanabe, Saitama (JP); Tamami Oda, Saitama (JP); Tsuyoshi Sato, Saitama (JP); Yukitaka Saito, Saitama (JP)

(73) Assignee: Pioneer Corporation, Tokyo (JP)

(*) Notice: Subject to any disclaimer, the term of this patent is extended or adjusted under 35 U.S.C. 154(b) by 18 days.

(21) Appl. No.: 10/281,279

(22) Filed: Oct. 28, 2002

(65) Prior Publication Data

US 2003/0083812 A1 May 1, 2003

(30) Foreign Application Priority Data

Oct. 30, 2001 (JP) .......................... P2001-333230

(51) Int. Cl.
*G01C 21/34* (2006.01)
*G08G 1/00* (2006.01)

(52) U.S. Cl. ...................................... 701/209; 701/117

(58) Field of Classification Search ................ 701/117, 701/118, 119, 209; 340/905, 934, 992, 995.13; 342/454

See application file for complete search history.

(56) References Cited

U.S. PATENT DOCUMENTS 5,182,555 A * 1/1993 Sumner ...................... 340/905
5,699,056 A * 12/1997 Yoshida ...................... 340/905
5,864,305 A * 1/1999 Rosenquist ................. 340/905
5,933,100 A 8/1999 Golding
6,012,012 A * 1/2000 Fleck et al. ................. 701/117
6,021,371 A 2/2000 Fultz
6,092,020 A * 7/2000 Fastenrath et al. .......... 701/119
6,167,333 A * 12/2000 Gehlot ........................ 701/35
6,209,026 B1 3/2001 Ran et al.
6,256,577 B1 * 7/2001 Graunke ..................... 701/117
6,292,743 B1 9/2001 Pu et al.
6,356,836 B1 * 3/2002 Adolph ....................... 701/208
6,427,113 B1 * 7/2002 Rahman ..................... 701/117
2002/0177942 A1 * 11/2002 Knaian et al. ............. 701/117

FOREIGN PATENT DOCUMENTS

| | | |
|---|---|---|
| DE | 196 11 915 A1 | 10/1997 |
| DE | 196 51 143 A1 | 6/1998 |
| EP | 1 024 466 A1 | 8/2000 |
| GB | 2 360 588 A | 9/2001 |

* cited by examiner

*Primary Examiner*—Michael J. Zanelli
(74) *Attorney, Agent, or Firm*—Sughrue Mion, PLLC

(57) ABSTRACT

A road status data providing system includes a server for transmitting/receiving data via a communication line and a plurality of vehicle terminals. The server includes a transmitting/receiving unit for transmitting/receiving data to and from the plurality of vehicle terminals, a vehicle trend management database for managing vehicle trends of the plurality of vehicle terminals, and a totaling unit for totaling status data indicative of a status of vehicles at a prescribed point on the basis of the vehicle trend management database. Each of the vehicle terminals includes a transmitting/receiving unit for transmitting/receiving data to and from the server, a present position determining unit for determining the present position of the vehicle, and a creating unit for creating status data requesting information for acquiring the status data at the prescribed point.

6 Claims, 9 Drawing Sheets

FIG. 14A

DESTINATION: OO AMUSEMENT PARK

STATUS: AT PRESENT OO VEHICLES, DESTINATION IS BEING SET

FIG. 14B

DESTINATION: OO A AMUSEMENT PARK

STATUS: IN THE VICINITY OF POINT A, O VEHICLES ARE RUNNING TOWARD DESTINATION

FIG. 14C

DESTINATION: OO A AMUSEMENT PARK

STATUS: IN THE VICINITY OF POINT A, O VEHICLES ARE RUNNING TOWARD THE DESTINATION; AND O VEHICLES ARE TO PASS THE NEIGHBORHOOD OF THE DESTINATION

FIG. 14D

DESTINATION: OO A AMUSEMENT PARK

STATUS: AFTER TWO HOURS, O VEHICLE ARE TO APPROACH THE NEIGHBORHOOD OF THE DESTINATION

FIG. 14E

DESTINATION: OO A AMUSEMENT PARK

STATUS: O VEHICLES ARE BEING NAVIGATED ON THE SAME ROUTE AS YOUR VEHICLE RUNS

ROAD STATUS DATA PROVIDING SYSTEM

CROSS REFERENCE OF RELATED APPLICATION

This application is based on and claims priority under 35 U.S.C. §119 with respect to Japanese Patent Application No. 2001-333230 filed on Oct. 30, 2001, the entire content of which is incorporated herein by reference.

BACKGROUND OF THE INVENTION

1. Field of the Invention

This invention relates to a road status data providing system, and a server and a vehicle terminal for providing road status data.

2. Description of the Related Art

A conventional navigation device is mounted in a vehicle (mounted in shipment of the vehicle or installed afterwards) and generally executes road navigation for each vehicle using map data and a program for running a system which are stored in a large scale storage device such as a CD (COMPACT DISC), DVD (DIGITAL VERSATILE DISC or DIGITAL VIDEODISC), or HDD (HARD DISK DRIVE), etc.

Some conventional navigation devices are given a communication function based on a system such as VICS (VEHICLE INFORMATION AND COMMUNICATION SYSTEM) in which traffic jam information received from the center of the VICS is distinguishably displayed on a map on a display installed in a vehicle, for example, like a traffic jam in red and a slight traffic jam in orange.

The conventional display of a traffic jam status has a problem that it cannot be sufficiently ascertained whether the traffic jam on the same road should be attributable to the vehicles running toward the same destination or different destinations.

For example, it is assumed that in the case of going to an amusement facility, the road is jammed with vehicles. In this case, it cannot be exactly ascertained whether the traffic jam is attributable to the vehicles going to the pleasure facility, a place farther than it or another place nearer than it.

SUMMARY OF THE INVENTION

An object of this invention is to provide a road status data providing system including a server for transmitting/receiving data via a communication line and a plurality of vehicle terminals which computes the number of vehicles which may pass a prescribed point and a predetermined range around the predetermined point on the basis of a request from a vehicle terminal for a server (management center of the road status data providing system) about the road status data at the prescribed point or within the predetermined range, and transmits the road status data to the vehicle terminal of a requester.

In order to attain the above object, there is provided a road status data providing system including a server for transmitting/receiving data via a communication line and a plurality of vehicle terminals, said server comprising:

a transmitting/receiving unit for transmitting/receiving data to and from the plurality of vehicle terminals;

a vehicle trend management database (which is mainly constructed by an individual database 203 in FIG. 3) for managing vehicle trends of the plurality of vehicle terminals; and a totaling unit for totaling status data indicative of a status of vehicles at a prescribed point on the basis of the vehicle trend management database, and each of the vehicle terminals comprising:

a transmitting/receiving unit for transmitting/receiving data to and from the server;

a present position determining unit for determining the present position of the vehicle; and a creating unit for creating status data requesting information for acquiring the status data at the prescribed point.

In accordance with this configuration, totaling of road status data at any prescribed point requested by the vehicle terminal can be performed by the server using the vehicle trend management database and the totaling result can be transmitted to the vehicle terminal.

In the road status data providing system, the vehicle terminal transmits the present position information acquired by the present position determining unit at regular time intervals; and the server receives the present position information transmitted from the vehicle terminal and updates the vehicle trend management database as occasion demands on the basis of the present position information, whereby the present position of the vehicle in the vehicle trend management database is always managed.

Also, the totaling unit in the server totals the number of vehicles running toward the prescribed point on the basis of the status data requesting information transmitted from the vehicle terminal.

The server further comprises a route searching unit for searching a route from the present position to the destination on the basis of destination information transmitted from the vehicle terminal.

In accordance with configuration, a navigation function is added and the set destination data can be used for totaling the number of vehicles running toward the prescribed point, thereby realizing more accurately totaling.

The server further comprises an estimated route searching unit for estimating a destination of a vehicle to search the route to the destination for the vehicle which is managed by the vehicle trend management database and is not conducting the route searching.

The vehicle trend management database in the server also stores the route searching result by the route searching unit and the estimated route searching result by the estimated route searching unit.

In accordance with this configuration, the vehicle trend management database always accumulatively stores the newest searching result by the route searching unit and the estimated route searching result for each vehicle, which is used for next totaling processing.

The estimated route searching unit in the server estimates the destination of a vehicle on the basis of the running direction of the vehicle and history information stored in the vehicle trend management database.

In accordance with this configuration, the destination of the vehicle which has not set the destination can be estimated on the basis of the present position information transmitted at regular intervals and the past history information of the vehicle to estimate the route corresponding to the estimated destination, thereby acquiring a reasonable totaling result.

The creating unit of the vehicle terminal creates the status data requesting information which includes position information for indicating the prescribed point, range information for specifying a prescribed range inclusive of the point and time information for setting a time when the status data is to be acquired.

The totaling unit in the server defines roads crossing the outline of the range on the basis of the position information and range information with reference to the vehicle trend management database to total the number of vehicles which will run in the range using the roads at the time and set the point as a destination for each of the roads.

In accordance with this invention, there is also provided an information providing server for transmitting/receiving data for a plurality of vehicle terminals via a communication line, comprising:

a transmitting/receiving unit for transmitting/receiving data to and from the plurality of vehicle terminals;

a vehicle trend management database for managing vehicle trends of the plurality of vehicle terminals; and a totaling unit for totaling status data-indicative of a status of vehicles at a prescribed point on the basis of the vehicle trend management database.

In accordance with this configuration, the totaling processing in the road status at the prescribed point requested by a plurality of vehicle terminals can be requested can be performed in a unified way using the vehicle trend management database.

The transmission/reception unit receives the present position information transmitted from the vehicle terminal, and the vehicle trend management database updates the vehicle trend management database as occasion demands on the basis of the present position information.

In accordance with this configuration, the present position data of the vehicle stored in the road trend management database is always updated to the newest.

The totaling unit totals the number of vehicles running toward the prescribed point on the basis of the status data requesting information transmitted by the vehicle terminal.

The information providing server further comprises a route searching unit for searching a route from the present position to the destination on the basis of destination information transmitted from the vehicle terminal.

In accordance with the configuration, a navigation function is added and the set destination data can be used for totaling the number of vehicles running toward the prescribed point, thereby realizing more accurately totaling.

The information providing server further comprises an estimated route searching unit for estimating the destination of a vehicle to search the route to the destination for the vehicle which is managed by the vehicle trend management database and is not conducting the route searching.

In accordance with this invention, there is further provided a vehicle terminal for transmitting/receiving data via a communication line for an information providing server, comprising:

a vehicle trend management database for managing vehicle trends of a plurality of vehicle terminals;

a totaling unit for totaling status data indicative of a status of vehicles at a prescribed point on the basis of the vehicle trend management database;

a transmitting/receiving unit for transmitting/receiving data to and from the server;

a present position determining unit for determining the present position of the vehicle; and a creating unit for creating status data requesting information for acquiring the status data at the prescribed point.

The vehicle terminal transmits the present position information acquired by the present position determining unit to the server at regular time intervals.

In accordance with this configuration, the present position data of the vehicle stored in the road trend management server can always be updated to newest.

The creating unit creates the status data requesting information which includes position information for indicating the prescribed point, range information for specifying a prescribed range inclusive of the point and time information for setting a time when the status data is to be acquired.

In accordance with this configuration, the user can create the status data requesting information which includes position information for indicating the prescribed point, range information for specifying a prescribed range inclusive of the point and time information for setting a time when the status data is to be acquired, thereby easily requesting the server to provide the road status data.

In accordance with this invention, there is further provided a program for providing road status data, which causes the computer included in the vehicle terminal in the above-mentioned road status data providing system as a transmitting/receiving unit for transmitting/receiving data to and from the server;

a present position determining unit for determining the present position of the vehicle;

a creating unit for creating status data requesting information for acquiring the status data at the prescribed point.

In accordance with this invention, there is further provided an information recording medium wherein the above program for providing the road status data according to claim 18 is recorded so as to be readable by the computer.

BRIEF DESCRIPTION OF THE DRAWINGS

FIGS. 14A to 14E are views showing an example of display by characters as a displaying format.

DETAILED DESCRIPTION OF THE PREFERRED EMBODIMENTS

Figure 1:
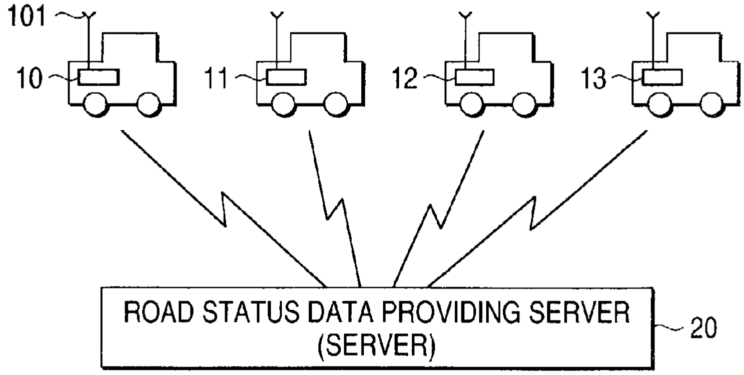
FIG. 1 is a view showing the entire configuration of this invention.

Now referring to the drawings, an explanation will be given of the configuration and operation of this invention.

FIG. 1 is a view showing the entire hardware configuration of a road status data providing system according to this invention.

In FIG. 1, reference numeral 20 denotes a road status data providing system managing center (server) that is being managed by an enterprise which manages the road status data providing system according to this invention.

Reference numerals 10, 11, 12 and 13 denote terminals for the road status data providing system, which are installed on vehicles, respectively. Theses terminals are connected to the road status data providing system managing center 20 via a communication network (inclusive of wireless communication by radio waves or optical communication).

Figure 2:
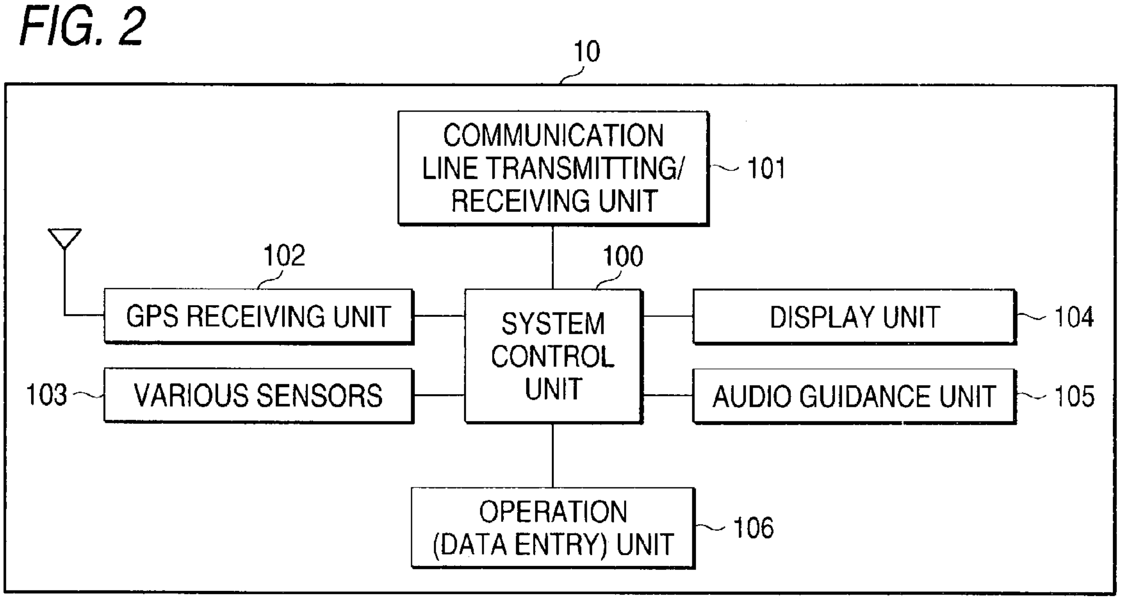
FIG. 2 is a view showing the configuration of a vehicle-mounted navigation terminal.

FIG. 2 is a block diagram showing the arrangement of the terminal which is mounted on a vehicle and used for the road status data providing system.

In FIG. 2, reference 100 denotes a system control unit in which CPU for executing the entire management occupies a central position.

Reference numeral 102 denotes a GPS (Global Positioning System) receiving unit, and reference numeral 103 denotes various sensors such as a gyro which is used to assist the measurement of the present position of a vehicle.

Reference numeral 101 denotes a transmitting/receiving unit for transmitting/receiving data to and from the server through a communication line. Reference numeral 104 denotes a display unit for displaying a map and others. Reference numeral 105 denotes a voice guiding unit.

Reference numeral 106 denotes an operation unit for executing data entry which can be used in combination with a keyboard or a speech input device.

Figure 3:
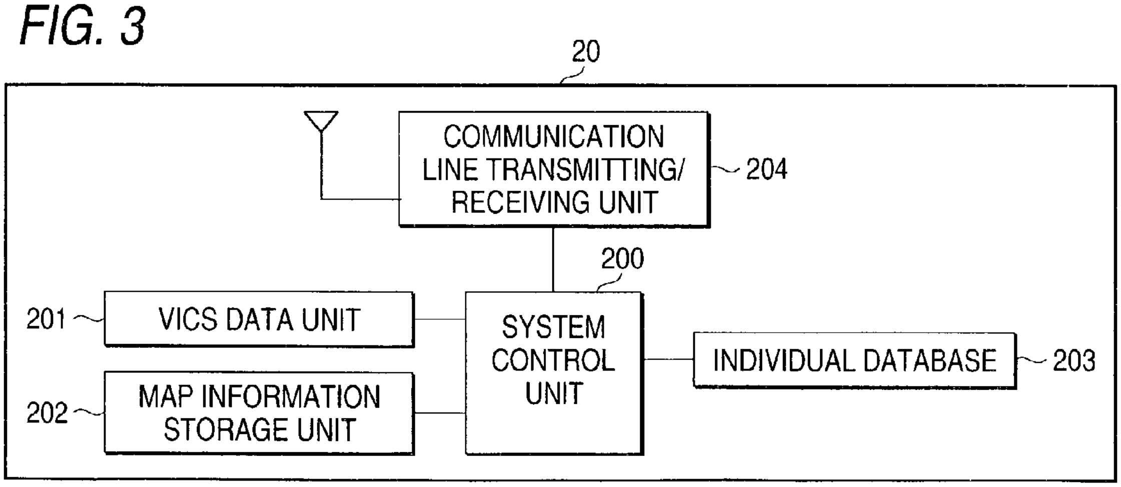
FIG. 3 is a view showing the configuration of a server (navigation dealer).

FIG. 3 is a block diagram showing the configuration of the server which is installed on the managing center 20 for the road status data providing system which executes the transmission/reception of data to and from the vehicle terminal 10 mounted on the vehicle through a communication line.

In FIG. 3, reference numeral 200 denotes a system controlling unit in which CPU for executing the management of the server occupies a central position.

Reference numeral 201 denotes a VICS data unit which receives the VICS information transmitted by a VICS providing station (not shown) and stores the received data on the traffic jam status of a road while updating them as occasion arises for use of various kinds of processing.

Reference numeral 202 denotes a map information storage unit which stores map data necessary for the road status data providing system.

Incidentally, the map data can include not only road information but also various items of data on facilities, tourist attraction, etc. in the neighborhood of the road at issue.

Storage of the map information in the server permits more detailed newest data or various data to be easily updated. This provides more accurate road status data which meets user's demands.

The map information can also include data on construction and on an interrupting spot of the road.

Reference numeral 203 denotes an individual database of users, under contract to the road status data providing system according to this invention.

Incidentally, the road status data providing system according to this invention serves as a useful system alone, but serves a more useful system in combination with a communication navigation system.

In this case, a configuration is used in which a vehicle terminal sets a destination and transmits a request of searching a route from a present point to the destination to a server, and the server transmits the searching result to the vehicle terminal. The server has functions capable of executing both of road status data providing service and route searching service.

In the following description, it is assumed that the server has functions capable of executing both of road status data providing service and route searching service.

Therefore, the individual database 203 stores the information of the destination and present point of the pertinent vehicle received through the communication line and the result of the route searching as history information that is the data inclusive of the past data during a significant period.

The individual database can be used for the processing of computation and charging of a fee using the communication navigation system.

Now referring to the sequence of FIG. 4, an explanation will be given of the flow of data between the server 20 and the server terminal 10 in the road status data providing system according to this invention (when the route searching is processed as the navigation function).

Figure 4:
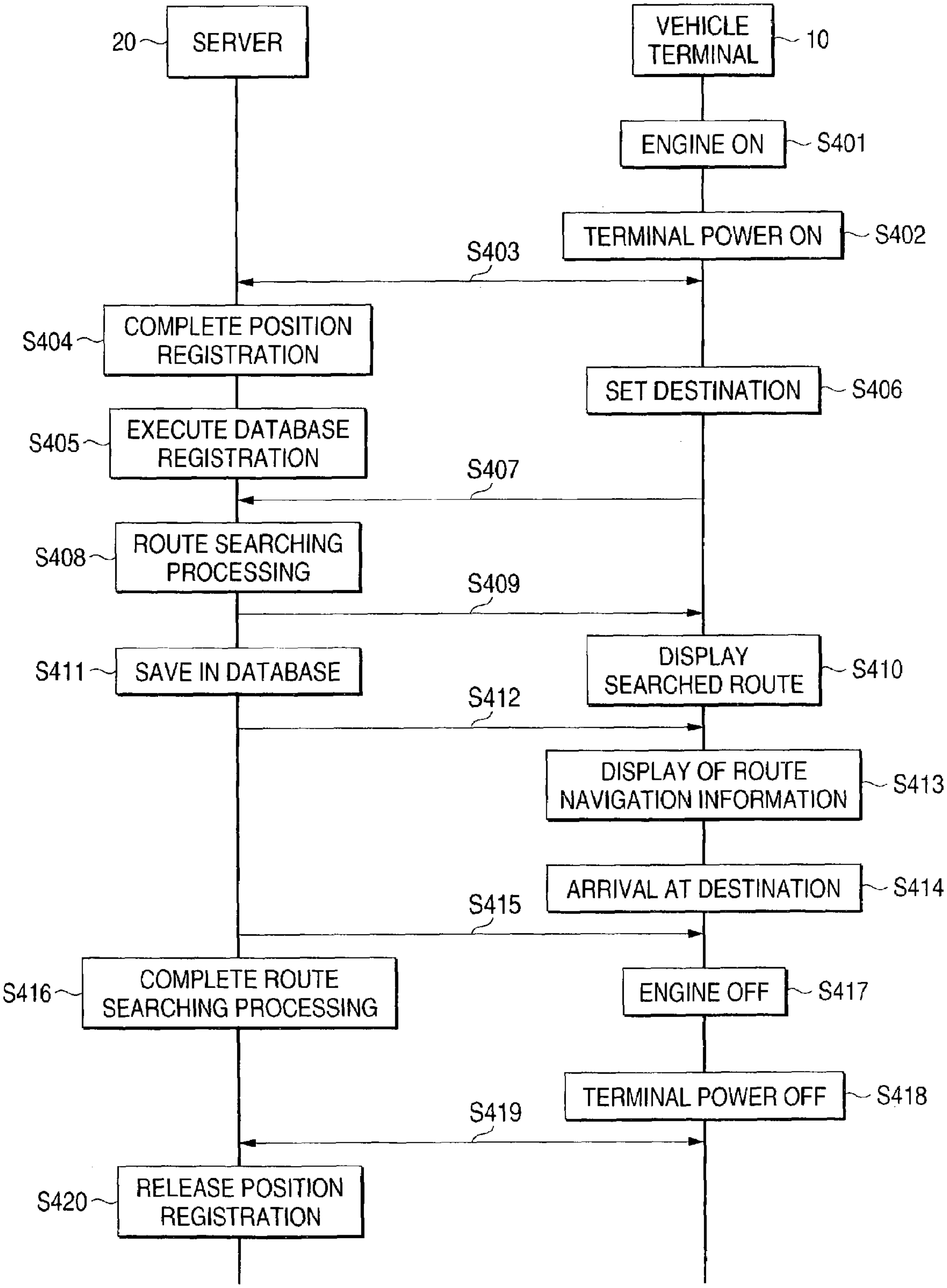
FIG. 4 is a view showing the flow of data between the server and vehicle terminal.

Incidentally, it should be noted that although the vehicle terminal 10 is shown alone in FIG. 4, data transmission/reception is carried out between the server 20 and a large number of vehicle terminals under contract to the road status data providing system.

First, in the vehicle terminal 10, the power therefor is turned on when the engine of the vehicle is turned on.

Thereafter, the present position of one's own vehicle, which is measured using the outputs from the GPS receiving unit 102 and various sensor units 103, is transmitted to the sever 20 (step S403) for executing the processing of position registering (step S404).

In FIG. 4, this position registering processing of the vehicle is executed only once when the engine is turned on. However, usually, this is carried out repeatedly over a prescribed period so that the newest present position information of each vehicle is transmitted to the server 20.

The server 20 receives the present position information of the vehicle and executes the position registering processing so that the present position information is registered in the individual database 203 (step S405).

Incidentally, this present position registering permits the measured (estimated) value of the number of vehicles on the road to be computed (which is executed by the server 20 described later) more precisely by registering all the vehicles under contract to the road status data providing system in the server 20 to the individual database 203 regardless of whether the vehicle hopes guidance to the destination.

Next, the vehicle which hopes the navigation to the destination executes the processing of setting the destination (step S406) and transmits the point information of the destination (e.g. information of latitude/longitude) (step S407).

The server 20, when it receives the point information, executes the processing of searching the route between the present position of the pertinent vehicle and the destination (step S408).

Incidentally, the route searching processing can be executed more exactly by using not only the map data stored in the map information storage unit 202 in FIG. 3 but also the VICS information stored in the VICS data unit 201 and the data on construction and on an interrupting spot of the road related to the route.

The searching result data related to the searched route is transmitted to the vehicle which has requested the route searching (step S409).

The vehicle terminal 10 which has received the route searching result displays the searching result on the display unit 104 (step S410).

The server 20 saves the route searching result in the individual database 203 (step S411).

Incidentally, in FIG. 4, the position registration and the transmission of the searching result are executed only once. However, by transmitting the present position data of the vehicle at regular time intervals to the server 20, the server 20 can always acquire the newest road status to execute the navigation to the destination more precisely.

The server 20 transmits the route navigation information for navigating the vehicle equipped with the navigation terminal 10 to the vehicle terminal 10 (step S412).

The vehicle terminal 10 displays the route navigation information on the display unit 104 (step S413).

The user drives his own vehicle on the basis of the route searching result (route navigation information) which has been sequentially transmitted from the server.

The server 20 determines whether or not the pertinent vehicle has arrived at the destination on the basis of comparison between the present position information of the vehicle and the position of the destination. If the vehicle has arrived at the destination, the server 20 transmits an arrival notice signal to the server terminal 10.

Incidentally, the vehicle terminal can also execute the processing of the step S415.

The server 20 completes the route searching processing for the pertinent vehicle by the transmission of the arrival notice signal (step S416).

If the driver turns OFF the engine when the vehicle has arrived at the destination (step S417), the vehicle terminal 10 executes the processing of turning OFF the power source (step S418)

The server 20 release the position registration of the vehicle by turning OFF the power of vehicle terminal 10.

As understood from the above description, the sequence shown in FIG. 4 illustrates the flow of data in the route searching service (navigation service) which is preferably used in combination with the road status data providing system.

Figure 5:
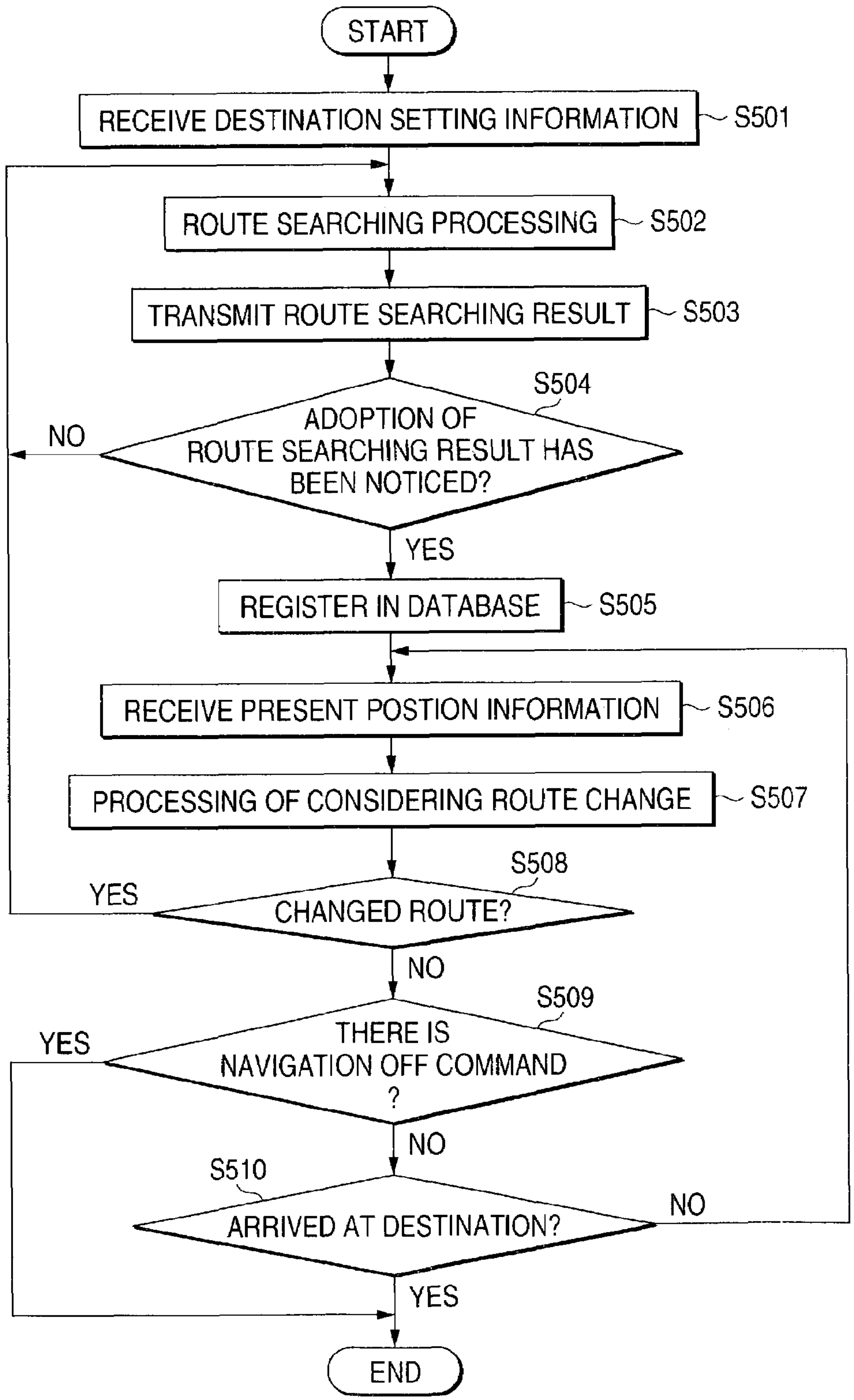
FIG. 5 is a view showing the procedure of processing in the server in route searching.

Next, now referring to FIG. 5, an explanation will be given of the procedure of processing in the server 20 during the route searching.

First, the server 20 is in a situation where it receives the present position information of the pertinent vehicle at regular time intervals from the vehicle terminal 10 and consistently acquires the present position of the vehicle.

In such a situation, the information of setting a destination is transmitted by the vehicle terminal 10 and received by the server 20 (step S501).

The server 20 executes the route searching processing on the basis of the present position information of the pertinent vehicle and the requested destination information (step S502).

The server 20 transmits the route searching result to the vehicle terminal 10 (step S503).

In the decision whether or not the received route searching result is adopted (step S504), if the answer is YES (the route searching result is adopted), the pertinent vehicle is registered on the individual database 203 (step S505).

The individual database 203 manages the present position information and destination information for each vehicle and the route information from the present position to the destination.

On the other hand, if the decision of step S504 is NO (the route searching result is not adopted), the processing procedure returns to step S502 in which other route searching processing is executed again. This processing is executed repeatedly until the server receives the notice of adopting the route searching result from the pertinent vehicle.

The server 20 route-navigates the pertinent vehicle on the basis of the route searching result, and continues to receive the present position information of the vehicle at regular time intervals (step S506).

The server 20 checks whether or not there is the newest (best) route whenever the present position information of the pertinent vehicle is received (step S507).

If there is a traffic jam on the route being used for navigation as a result of checking in step S507, the driver (user) of the pertinent vehicle is authorized to decide whether or not to execute a route change (step S508).

If the user selects YES (route change) in the decision of step S507, the processing procedure returns to step S502 to execute the route searching again.

On the other hand, if the user select NO (no route charge) in the decision of step S507, decision is made on whether or not there is an navigation OFF command (step S509). If the server 20 receives the navigation OFF command (YES), it completes the route searching processing (END).

If the server 20 does not receive the navigation OFF command, it is decided whether or not the vehicle has arrived at the destination by comparing the information on the present position of the vehicle with the position information of the destination (step S510).

The step S510 corresponds to the "transmission of the arrival notice signal" in FIG. 4.

Incidentally, in this embodiment, whether or not the vehicle has arrived is decided by the server 20. However,- this can be also decided by the vehicle terminal 10 mounted on the vehicle. In this case, the arrival notice signal (S415) in FIG. 4 is transmitted from the vehicle terminal 10 to the server 20.

If the decision in step S510 is YES, the route searching processing is ended (END). If the vehicle does not still arrive at the destination, the procedure from step S506 is repeated until the vehicle arrives at the destination.

In this way, the server 20, when it receives the destination setting information from the vehicle terminal 10, executes the route searching and navigates the vehicle to the destination.

In this case, the information on the present position and destination of each vehicle and the information of the route from the present position to the destination, which are managed as a database, are used to compute (total) the information of providing (notifying) the status of vehicles at any point described later.

Next, an explanation will be given of the details of the road status data providing system according to this invention.

In order to execute the road status data providing service which is a main object of this invention, the vehicle terminal 10 requests the provision (notice) of the status of vehicles (number of vehicles to pass) at a prescribed time at a prescribed point (e.g. point A).

Referring to the sequence of FIG. 6, an explanation will be given of the flow of data between the server 20 and the vehicle terminal 10 for the request of providing the status of vehicles at any point in the road status data providing system according to this invention.

Figure 6:
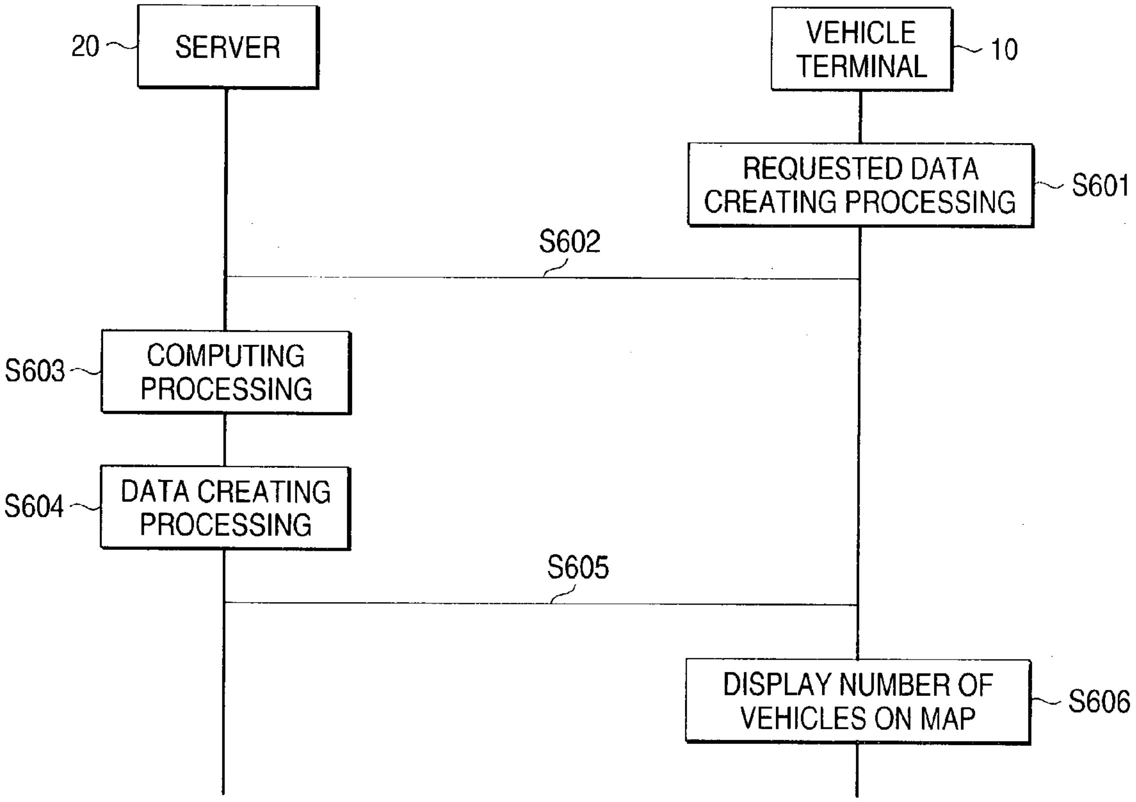
FIG. 6 is a view showing the flow of data between the server and the navigation terminal in processing of notifying the number of vehicles.

In FIG. 6, the vehicle terminal 10 is shown alone. However, the vehicle terminals under contract to the road status data providing system according to this invention transmit/receive data to and from the server 20.

First, the vehicle terminal 10 creates the request data for requesting the sever 20 to provide the number of vehicles (status of vehicles) running toward a set prescribed point or a prescribed area inclusive of the prescribed point (step S601)

An example of the request data to be created is as follows. Requested point data: latitude of 35.16.0, longitude of 137.45.25

Measured area data: 500 m around

Measured time data: a.m. 11:30

The contents of this request data are to total the number of vehicles which advance in the destination of the range having a radius of 500 m around the point having the north latitude of 35.16.0 and east longitude of 137.45.25, which is a prescribed point, at a.m. 11:30 (for example for ten minutes before and after the time).

The vehicle terminal 10 transmits the created request data to the server 20 (step S602).

The server 20 executes the computing processing for totaling the vehicle data related to the prescribed point (inclusive of the prescribed area and prescribed time) included in the request data received from the vehicle terminal 10 by accessing the individual database 203.

The individual database to be accessed of the vehicle terminals under contract to the road status data providing system (inclusive of the route searching system) according to this invention is the vehicles with the data in operation (the engine key is ON) and includes the vehicles which run requesting the route searching for the set destination and the vehicle which run without setting the destination.

In the processing of totaling in this step, for the vehicle which is requesting the route searching, the route searching corresponding to the destination can be made uniquely, whereas for the vehicle which is not requesting the route searching, the destination must be estimated to estimate the route (This processing is referred to as processing of searching the estimated route).

The processing of searching the estimated route can determine the advancing direction (vector) of the vehicle by accumulating the position data sequentially at regular time intervals transmitted from the vehicle and hence estimate it in combination with the past history data of the pertinent vehicle stored in the individual database.

The data acquired by the computing processing in step S603 is processed into the data for display in the requested format (step S604).

The data thus created is transmitted from the server 20 to the vehicle terminal 10 (step S605).

In the vehicle terminal 10, the received status of vehicles at the prescribed point is displayed on the display unit 104 (step S606).

The format of the display will be described in detail later.

Figure 7:
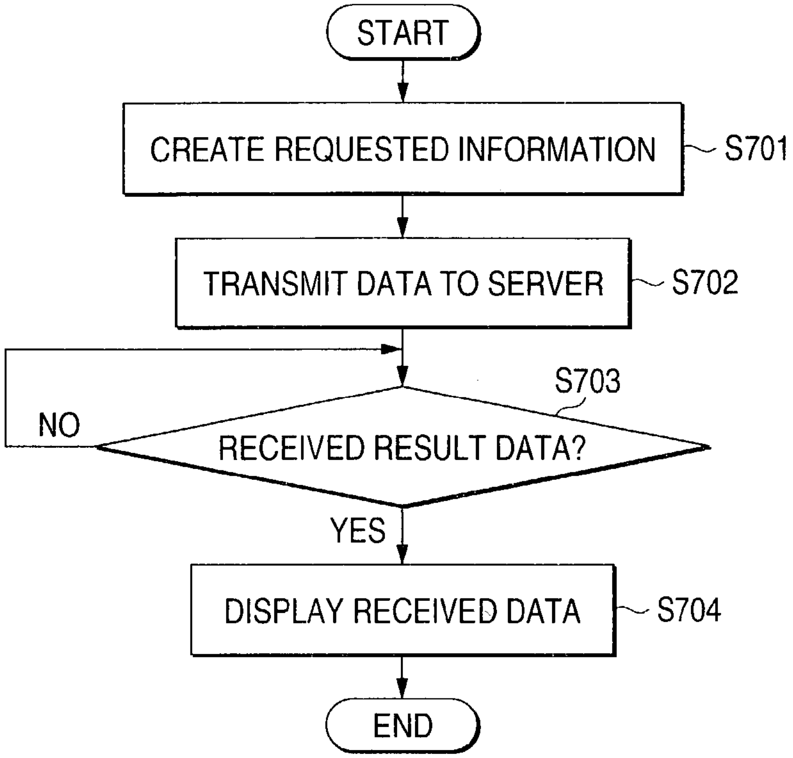
FIG. 7 is a view showing the processing procedure in the navigation terminal in the processing of notifying the number of vehicles.

Referring to the flowchart of FIG. 7, an explanation will be given of the processing procedure in the vehicle terminal 10 in the processing of providing (noticing) the status of vehicles at the prescribed point.

The vehicle terminal 10 creates the request data for requesting the server 20 to provide the number of vehicles running toward the destination (requesting point) or the prescribed area inclusive of the prescribed point (status of vehicles at the prescribed point) (step S701).

The request data thus created is transmitted to the sever 20 (step S702).

It is decided whether or not the vehicle terminal 10 has received the data of the totaled result for display from server 20 (step S703).

If the vehicle terminal 10 has received the data of the totaled result from the server 20, the received data is displayed on the display unit (step S704).

In this way, the vehicle terminals under contract to the road status data providing system request the server 20 to total the road status data at the prescribed point from the vehicle terminal 10, and display the totaled result on the display unit mounted on the vehicle.

Figure 8:
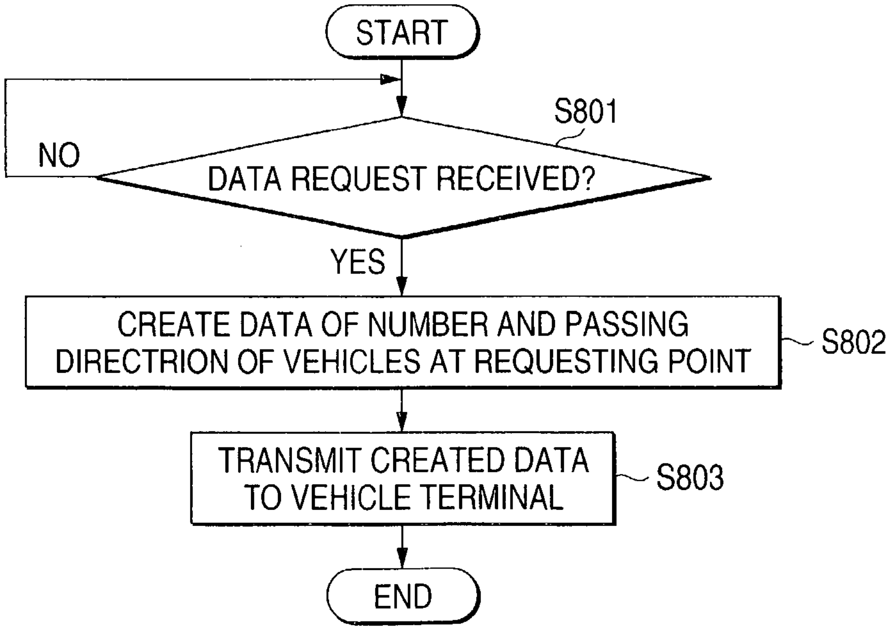
FIG. 8 is a view showing the processing procedure in the server in the processing of notifying the number of vehicles.

Referring to the flowchart of FIG. 8, an explanation will be given of the processing procedure in the server 20 in the processing of providing (noticing) the status of vehicles at the prescribed point.

The request data (data of a prescribed point, a prescribed range around the point and a prescribed time) is received from the vehicle terminal 10 (step S801).

Computation (creation) is executed of the data of the number and passing direction of vehicles at the prescribed point and the prescribed range around the prescribed point (step S802).

The data thus created is transmitted to the requesting vehicle terminal 10 (step S803).

In this way, the server in the road status data providing system executes the totaling processing according to a request of totaling of the road status data at the prescribed point and and transmits the totaling result to the requesting vehicle terminal 10.

Figure 9:
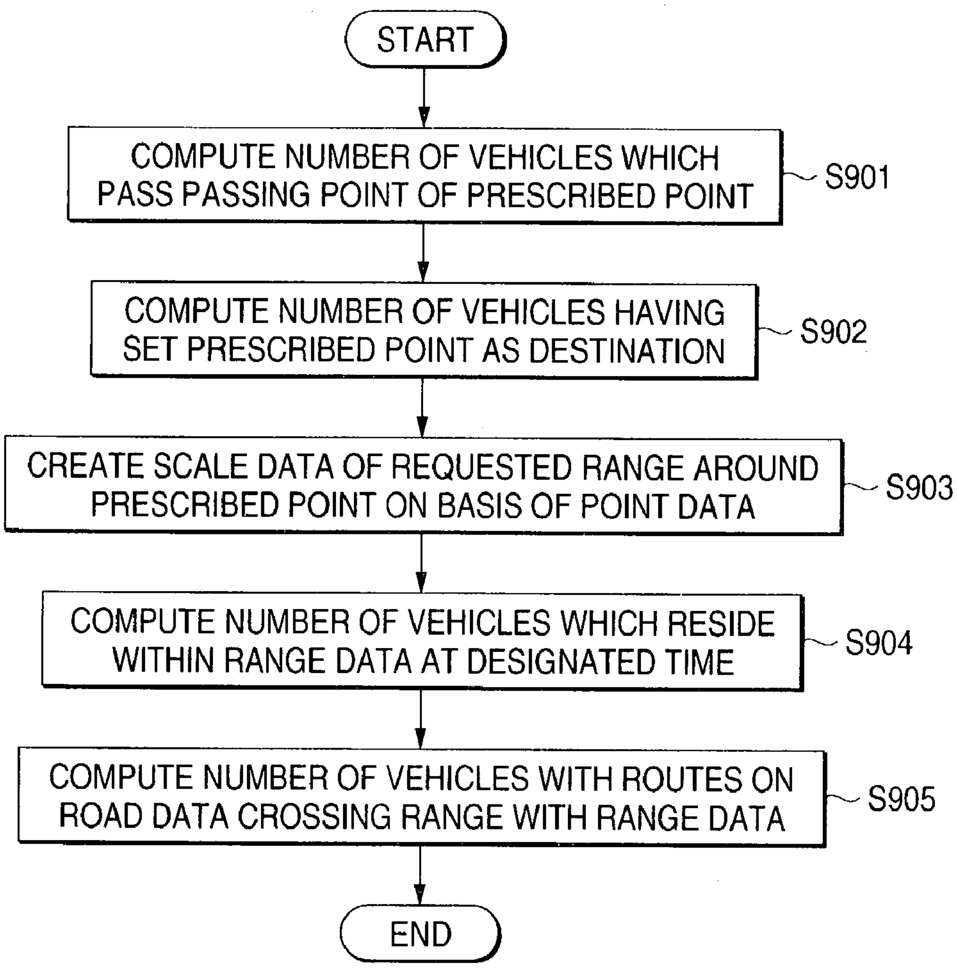
FIG. 9 is a view showing the more detailed processing procedure in the server in the processing of notifying the number of vehicles.

Referring to the flowchart of FIG. 9, and FIGS. 10 and 11, an explanation will be given of the details of the processing in step S802 in FIG. 8.

The number of vehicles which pass a passing point (road adjacent to the prescribed point) of the prescribed point (requested point) is computed (step S901).

Figure 10:
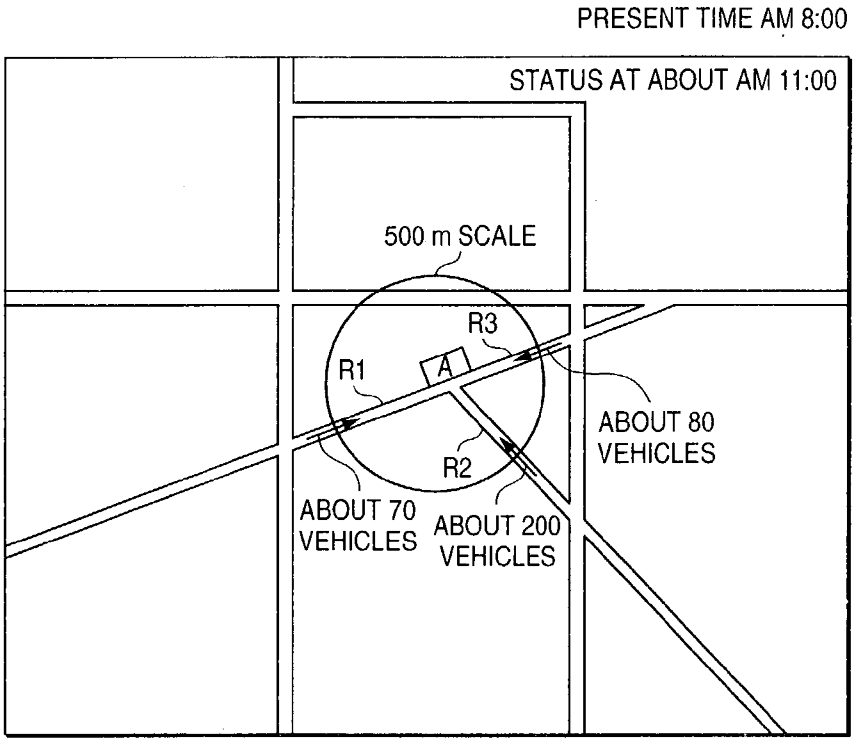
FIG. 10 is a view showing the number of vehicles which run toward the range within a radius of 500 m around point A at a prescribed time.

It is assumed that the prescribed point corresponds to A in FIG. 10.

The number of vehicles having set the point A as the destination (step S902) is computed.

The number of vehicles which pass the prescribed point A in FIG. 10 includes not only the number of the vehicles having set the point A as the destination but also the vehicles which pass the point A.

The number of vehicles is limited on the basis of the range data representative of the prescribed range around the prescribed point requested by the vehicle terminal 10 (step S903).

In the case of FIG. 10, the range data is 500 m. Therefore, the number of vehicles which are running toward the point A in the roads (R1, R2, R3) within the radius of 500 m around the point A as center can be computed.

Next, the number of vehicles is limited on the designated time (step S904).

At this stage, in FIG. 10, the number of vehicles residing within the requested range (radius of 500 m) at the designated time (AM 11:30) can be computed.

Further, the numbers of vehicles (about 70 vehicles on R1, about 200 vehicles on R2 and about 80 on R3) with the routes on the road data crossing the range with the range data are computed (step S905).

Now, in order to specify the running direction of the vehicle, the direction of crossing the range (running in or out from the range) is specified on the basis of the result of the route searching to create the data of the number of vehicles.

In the case of FIG. 10, only the number of vehicles which are running toward the point A in the range having a radius of 500 m is displayed.

Incidentally, in the explanation described above, the number of vehicles has been limited with reference to the inside of the circle within the radius represented by the range data. The shape for limiting maybe an ellipse, square and not restricted to circle.

In this way, processing of creating the data of the number and passing direction of vehicles at the prescribed point and prescribed range around the prescribed point is executed in the procedure of the prescribed point →prescribed range →prescribed time.

A detailed explanation will be given of the manner of the status of vehicles at the prescribed point displayed on the display unit 104 of the vehicle terminal 10 by the server 20.

FIG. 10 shows the number of vehicles which are to run toward within the range having a radius of 500 m around the point as center at an approximately prescribed time (AM 11:30), which is estimated at the present time AM 8:00.

In this figure, it is estimated that at about AM 11:30, there are three roads. R1, R2 and R3 within the range having a radius of 500 m and about 30 vehicles (R1), about 200 vehicles (R2) and about 70 vehicles (R3) run into the range (The number of vehicles are that of vehicles which run in the range for 10 minutes before and after at AM 11:30).

The display of the status of vehicles at the point A in FIG. 10 is based on the estimation at the present time AM 8:00. As the present time proceeds, the contents of display can be modified or changed according to the newest processing status in the server 20.

Figure 11:
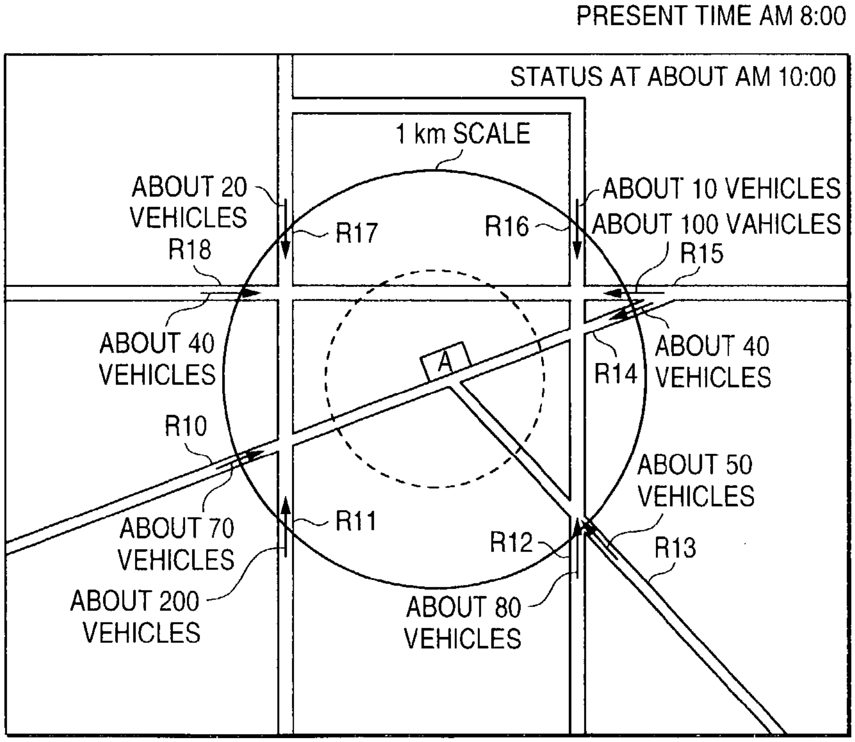
FIG. 11 is a view showing the number of vehicles which run toward the range within a radius of 1 km around point A at a prescribed time.

FIG. 11 shows the number of vehicles which will run into the point A at about a prescribed time (AM 10:00) when the measuring range having a radius of 1 km around the point A as center is specified as a range data from the vehicle terminal 10.

In this figure, it is estimated at the present time AM 8:00 that at about AM 10:00, there are nine roads R10 to R18 within the range, and about 70 vehicles (R10), about 200 vehicles (R11), about 80 vehicles (R12), about 50 vehicles. (R13), about 40 vehicles (R14), about 100 vehicles (R15), about 10 vehicles (R16), about 20 vehicles (R17) and about 40 vehicles (R18) will run into the range.

As described above, in accordance with the road status data providing system according to this invention, when the vehicle terminal 10 transmits a request of providing the status of vehicles at a prescribed point from the vehicle terminal 10 with the prescribed point (requesting point), a prescribed range data and prescribed time data being designated, the server 20 computes the number of vehicles which run into the prescribed range around the requested point using the accumulated individual database 203 and provides the computed result to the vehicle terminal 10.

An explanation will be given of another embodiment of the road status data providing system according to this invention.

Figure 12:
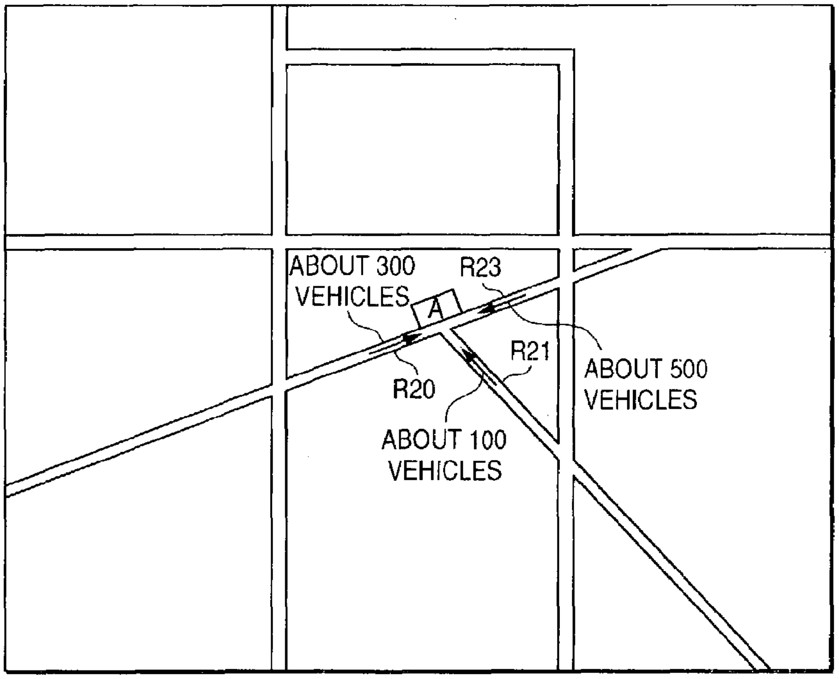
FIG. 12 is a view showing the number of vehicles which run toward the point A at present.

As another format of display, FIG. 12 shows the number of vehicles which run toward a prescribed point (point A) at the present time regardless of the range and time.

This figures displays that there are three roads R21 to R23 running to the point A, and about 300 vehicles (R21), about 100 vehicles (R22) and about 500 vehicles (R23) are running toward the point A at the present time from the respective roads.

Such a display permits the number of vehicles running toward the amusement facility located at the prescribed point A at the present time to know and is efficient to know the traffic jam status on the day.

Further, by transmitting the status data of vehicles data to the amusement facility located at a prescribed point, it can be used to estimate the number of visitors to the amusement facility in that day.

Figure 13:
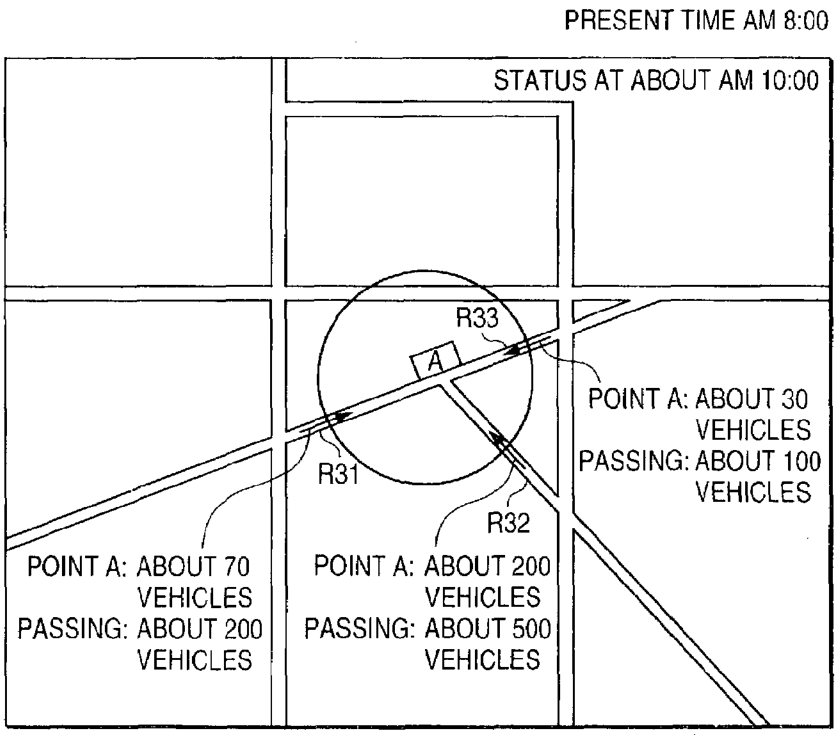
FIG. 13 is a view showing the number of vehicles which will run toward the point A at a prescribed time.

FIG. 13 shows the number of vehicles running into the range data having a radius of 500 m around a prescribed point (point A in FIG. 12) at about a prescribed time (AM 10:00) in a manner that the vehicles with the point A set as a destination and the vehicles passing the range data are distinguished from each other.

The word “passing” means to cross, toward the point A, the roads which cross the range data (with a radius of 500 m around the point A in this case).

It is estimated in this figure that at about AM 10:00, there are three roads R31 to R33 running into the range having a radius of 500 m, and about 70 vehicles (R31), about 200 vehicles (R32) and about 30 vehicles (R33) run into the destination of the point A, whereas about 200 vehicles (R31), about 500 vehicle (R32) and about 100 vehicles (R33) pass the range data.

To display the number of vehicle with a prescribed point set as a destination unit to display the number of vehicles running toward a specific amusement facility such as an amusement park. Therefore, this is efficient to distinguish the traffic jam status of the road from that of the facility at the prescribed point.

In FIGS. 10 to 13, the number of vehicle are described for each of the roads (directions) on the map including the destination (prescribed point) displayed on the display unit. However, unlike the display format on the map including the destination, the display can be made using characters as shown in FIGS. 14A to 14E.

Such a display format is useful to display the character information using a part of a screen while the route navigation screen is being displayed as the function of navigation (where the present position is far from the destination and the destination does not exist on the display screen).

Meanwhile, the server computes the number of vehicle on the basis of the number of vehicles which have requested the route searching while setting the destination and that which have not requested the route searching but estimated the route to pass from the present position and running direction of the vehicle. However, the server knows the data on only the vehicle under contract to the communication navigation system according to this invention. Therefore, to display the number of vehicles acquired taking the rate of the number of the above contract vehicle terminals to all the vehicles into consideration is more useful.

This processing can be fit to an actual traffic amount by previously storing, in the database, the rate of the number of all the vehicles to that of vehicles under contract to the road status data providing system sequentially measured for each of districts and correcting the number of vehicles actually totaled using the individual database according to this system.

The road status data providing system according, to this invention can be applied to management of a parking area in the pertinent destination (e.g. amusement facility) by informing the facility (under contract to the road status data providing system according to this invention) in the vicinity of the prescribed destination of the information on the number of vehicles running toward the prescribed destination collected by the server.

Further, a pleasure resort can previously know the number of vehicles running toward itself, and can prepare a suitable of number of lunches.

Where the vehicle stops with the engine turned OFF, the signal indicative of this fact is transmitted to the server so that the registration of the vehicle position is released.

However, where the vehicle in a rest station temporarily turns OFF the engine, the setting of the destination is not still released (the destination registered in the server is erased if the vehicle has arrived at the vicinity of the destination or setting of the destination is released). Therefore, when the engine is turned ON again, setting the destination is not required.

As described above, in the communication navigation system according to this invention, the present positions are acquired for all the vehicles with the engine being ON of the registered vehicles (vehicles under contract to the communication navigation system according to this invention) regardless of whether or not they have requested the route searching for their set destination. For this reason, it is possible to total (estimate) an accurate road status at any point.

In FIGS. 10 to 13, the totaled (estimated) value of the passed vehicles at a specific point is displayed as the number of vehicles. However, it is not necessary to display the number of vehicles. The traffic jam indices computed according to the capacity of each of the pertinent roads can be displayed in different displaying colors and different displaying formats.

The totaled (estimated) value of the number of vehicles in the above display unit is displayed on the basis of the vehicles under contract to the communication navigation system according to this invention. However, since all the vehicles running on a certain road are not under contract to the communication navigation system according to this invention, the total number of vehicles can be estimated on the basis of the share occupied by the contract vehicles.

In order to realize this, it is efficient to measure sequentially the rates of the number of vehicles under contract to the road status data providing system according to this invention to all the vehicles residing in each of districts, and store them in the database.

Incidentally, where a driver wants to know the traffic jam status at a prescribed point (e.g. point A), it is preferably displayed as the road status at the time when the vehicle has requested the display of the road status will pass the prescribed point. Therefore, the road status is totaled (estimated) in combination of various elements inclusive of the present position, running direction and speed of the pertinent vehicle.

According to this invention, there is provided a road status data providing system having a server for transmitting/receiving data via a communication line and a plurality of vehicle terminals, wherein the server comprising:

a transmitting/receiving unit for transmitting/receiving data to and from the plurality of vehicle terminals;

a vehicle trend management database for managing vehicle trends of the plurality of vehicle terminals; and a totaling unit for totaling status data indicative of a status of vehicles at a prescribed point on the basis of the vehicle trend management database, and wherein each of the vehicle terminals comprising:

a transmitting/receiving unit for transmitting/receiving data to and from the server;

a present position determining unit for determining the present position of the vehicle; and a creating unit for creating status data requesting information for acquiring the status data at the prescribed point.

In accordance with this configuration, totaling processing of road status data at any prescribed point requested by the vehicle terminal can be performed by the server using the vehicle trend management database and the totaled result can be transmitted to the vehicle terminal.

In the invention, the vehicle terminal transmits the present position information acquired by the present position determining unit at regular time intervals to the server; and the server receives the present position information transmitted from the vehicle terminal and updates the vehicle trend management database as occasion demands on the basis of the present position information, whereby totaling of the number of vehicles running toward the prescribed point requested by the vehicle terminal can be always processed on the basis of the newest vehicle trend management database.

In the invention, the server further comprises a route searching unit for searching a route from the present position to the destination on the basis of destination information transmitted from the vehicle terminal, and the server further comprises an estimated route searching unit for estimating a destination of a vehicle to search the route to the destination for the vehicle which is managed by the vehicle trend management database and is not performing the route searching. For this reason, a navigation function is added and the set destination data can be used for totaling the number of vehicles running toward the prescribed point, thereby realizing more accurately totaling.

In the invention, the vehicle trend management database in the server also stores the route searching result by the route searching unit and the estimated route searching result by the estimated route searching unit.

In accordance with this configuration, the vehicle trend management database always accumulatively stores the newest searching result by the route searching unit and the estimated route searching result for each vehicle, which can be effectively used for next totaling processing.

In the invention, the estimated route searching unit in the server estimates the destination of a vehicle on the basis of the running direction of the vehicle and history information stored in the vehicle trend management database. In accordance with this configuration, the destination of the vehicle which has not set the destination can be estimated on the basis of the present position information transmitted at regular time intervals and the past history information of the vehicle to estimate the route corresponding to the estimated destination, thereby acquiring a reasonable totaling result.

In the invention, the creating unit of the vehicle terminal creates the status data requesting information which includes position information for indicating the prescribed point, range information for specifying a prescribed range inclusive of the point and time information for setting a time when the status data is to be acquired. For this reason, the user can easily request acquisition of the road status data at a prescribed point from the vehicle terminal.

In the invention, the totaling unit in the server defines roads crossing the outline of the range on the basis of the position information and range information with reference to the vehicle trend management database to total the number of vehicles which will run in the range using the roads at the time and set the point as a destination for each of the roads. The totaling result, which indicates the road status within a prescribed range, can be used to decide an alternative route in the case of traffic jam.

According to the invention, there is provided an information providing server for transmitting/receiving data for a plurality of vehicle terminals via a communication line, comprising: a transmitting/receiving unit for transmitting/receiving data to and from the plurality of vehicle terminals; a vehicle trend management database for managing vehicle trends of the plurality of vehicle terminals; and a totaling unit for totaling status data indicative of a status of vehicles at a prescribed point on the basis of the vehicle trend management database. In accordance with this configuration, the totaling processing in the road status at the prescribed point requested by a plurality of vehicle terminals can be performed in a unified way using the vehicle trend management database.

In the invention, the transmission/reception unit receives the present position information transmitted from the vehicle terminal, and the vehicle trend management database updates the vehicle trend management database as occasion demands on the basis of the present position information. In accordance with this configuration, the present position data of the vehicle stored in the road trend management database can always be updated to the newest.

In the invention, the totaling unit totals the number of vehicles running toward the prescribed point on the basis of the status data requesting information transmitted by the vehicle terminal. Therefore, the number of vehicles running toward the prescribed point can be easily determined. The invention further comprises a route searching unit for searching a route from the present position to the destination on the basis of destination information transmitted from the vehicle terminal. In accordance with configuration, a navigation function is added and the set destination data can be used for totaling the number of vehicles running toward the prescribed point, thereby realizing more accurate totaling.

The invention further comprises an estimated route searching unit for estimating a destination of a vehicle to search the route to the destination for the vehicle which is managed by the vehicle trend management database and is not making the route searching, thereby providing more reasonable totaling result.

According to the invention, there is provided a vehicle terminal for transmitting/receiving data via a communication line for an information providing server including a vehicle trend management database for managing vehicle trends of a plurality of vehicle terminals; and a totaling unit for totaling status data indicative of a status of vehicles at a prescribed point on the basis of the vehicle trend management database, wherein the vehicle terminal comprises a transmitting/receiving unit for transmitting/receiving data to and from the server; a present position determining unit for determining the present position of the vehicle; a creating unit for creating status data requesting information for acquiring the status data at the prescribed point. In accordance with this configuration, the user can request the server to provide the present position and road status data from the vehicle terminal.

In the invention, the vehicle terminal transmits the present position information acquired by the present position determining unit to the server at regular time intervals. In accordance with this configuration, the present position data of the vehicle stored in the road trend management database can always be updated to the newest.

In the invention, the creating unit creates the status data requesting information which includes position information for indicating the prescribed point, range information for specifying a prescribed range inclusive of the point and time information for setting a time when the status data is to be acquired. In accordance with this configuration, the user can create the status data requesting information which includes position information for indicating the prescribed point, range information for specifying a prescribed range inclusive of the point and time information for setting a time when the status data is to be acquired, thereby easily requesting the server to provide the road status data.

According to the invention, there is provided a program for providing road status data, which causes the computer included in the vehicle terminal in the above road status data providing system as a transmitting/receiving unit for transmitting/receiving data to and from the server; a present position determining unit for determining the present position of the vehicle; a creating unit for creating status data requesting information for acquiring the status data at the prescribed point.

According to the invention, there is provided an information recording medium wherein the program for providing the road status data according to claim 18 is recorded so as to be readable by the computer.

What is claimed is:

1. A road status data providing system including a server for transmitting/receiving data via a communication line and a plurality of vehicle terminals, wherein:

said server comprises:

a transmitting/receiving unit for transmitting/receiving data to and from said plurality of vehicle terminals;

a vehicle trend management database for managing vehicle trends of said plurality of vehicle terminals;

a totaling unit for totaling status data indicative of a status of vehicles at a prescribed point on the basis of said vehicle trend management database;

a route searching unit; and an estimated route searching unit;

each of said vehicle terminals comprises:

a transmitting/receiving unit for transmitting/receiving data to and from said server;

a present position determining unit for determining the present position of the vehicle; and a creating unit for creating status data requesting information for acquiring the status data at said prescribed point; and said totaling unit in the server totals the number of vehicles running toward said prescribed point on the basis of the status data requesting information transmitted by said vehicle terminal;

said route searching unit is for searching a route from the present position to the destination on the basis of destination information transmitted from said vehicle terminal;

said estimated route searching unit is for estimating the destination of a vehicle to search the route to said destination for the vehicle which is managed by said vehicle trend management database and is not conducting the route searching; and said vehicle trend management database in said server also stores the route searching result by said route searching unit and the estimated route searching result by said estimated route searching unit.

2. A road status data providing system including a server for transmitting/receiving data via a communication line and a plurality of vehicle terminals, wherein:

said server comprises:

a transmitting/receiving unit for transmitting/receiving data to and from said plurality of vehicle terminals;

a vehicle trend management database for managing vehicle trends of said plurality of vehicle terminals;

a totaling unit for totaling status data indicative of a status of vehicles at a prescribed point on the basis of said vehicle trend management database;

a route searching unit; and an estimated route searching unit; each of said vehicle terminals comprises:

a transmitting/receiving unit for transmitting/receiving data to and from said server;

a present position determining unit for determining the present position of the vehicle; and a creating unit for creating status data requesting information for acquiring the status data at said prescribed point; and said totaling unit in the server totals the number of vehicles running toward said prescribed point on the basis of the status data requesting information transmitted by said vehicle terminals;

said route searching unit is for searching a route from the present position to the destination on the basis of destination information transmitted from said vehicle terminal;

said estimated route searching unit is for estimating the destination of a vehicle to search the route to said destination for the vehicle which is managed by said vehicle trend management database and is not conducting the route searching; and said estimated route searching unit in the server estimates the destination of a vehicle on the basis of the running direction of said vehicle and history information stored in said vehicle trend management database.

3. A road status data providing system including a server for transmitting/receiving data via a communication line and a plurality of vehicle terminals, wherein:

said server comprises:

a transmitting/receiving unit for transmitting/receiving data to and from said plurality of vehicle terminals;

a vehicle trend management database for managing vehicle trends of said plurality of vehicle terminals; and a totaling unit for totaling status data indicative of a status of vehicles at a prescribed point on the basis of said vehicle trend management database;

each of said vehicle terminals comprises:

a transmitting/receiving unit for transmitting/receiving data to and from said server;

a present position determining unit for determining the present position of the vehicle; and a creating unit for creating status data requesting information for acquiring the status data at said prescribed point:

said totaling unit in the server totals the number of vehicles running toward said prescribed point on the basis of the status data requesting information transmitted by said vehicle terminals; and said creating unit of said vehicle terminal creates said status data requesting information which includes position information for indicating said prescribed point, range information for specifying a prescribed range inclusive of said point and time information for setting a time when said status data is to be acquired.

4. The road status data providing system according to claim 3, wherein said totaling unit in the server defines roads crossing the outline of said range on the basis of said position information and range information with reference to said vehicle trend management database to total the number of vehicles which will run in said range using the roads at said time and set said point as a destination for each of the roads.

5. A system, comprising:

a server, comprising:

a first transceiver circuit that transmits data to and receives data from a vehicle terminal; and a first control circuit that determines a status of vehicles at a prescribed point based on vehicle trend management data, wherein said vehicle terminal comprises:

a second transceiver circuit that transmits data to and receives data from said server; and a second control circuit that determines the present position of a vehicle in which the vehicle terminal is located and that instructs the second transceiver to output a request of the status of vehicles at said prescribed point to said server;

wherein the first control circuit totals the number of vehicles traveling toward the prescribed point based on the request transmitted from the vehicle terminal wherein said second control circuit creates the request; and wherein the request comprises position information for indicating said prescribed point, range information for specifying a prescribed range inclusive of said prescribed point, and time information for setting a time when said status is to be acquired.

6. The system according to claim 5, wherein said first control circuit defines roads crossing an outline of said range based on said position information and said range information with reference to said vehicle trend management data to total the number of vehicles which will run in said range using the roads at said time and set said point as a destination for each of the roads.

* * * * *